United States Patent [19]

Christie

[11] Patent Number: 4,779,916

[45] Date of Patent: Oct. 25, 1988

[54] ADJUSTABLE FRAMEWORK FOR THE CARGO BED OF A PICK-UP TRUCK

[76] Inventor: Larry L. Christie, 12300 Fleming #44, Houston, Tex. 77013

[21] Appl. No.: 74,866

[22] Filed: Jul. 17, 1987

[51] Int. Cl.⁴ .............................................. B60P 3/00
[52] U.S. Cl. .......................................... 296/3; 296/26; 296/171
[58] Field of Search .................... 296/3, 27, 26, 171

[56] References Cited

U.S. PATENT DOCUMENTS

| | | | |
|---|---|---|---|
| 4,138,046 | 2/1979 | De Freze | 296/3 |
| 4,405,170 | 9/1983 | Raya | 296/3 |
| 4,423,899 | 1/1984 | Langmead | 296/3 |
| 4,509,787 | 4/1985 | Knaack | 296/3 |
| 4,603,901 | 8/1986 | McIntosh | 296/27 |

Primary Examiner—Robert R. Song
Attorney, Agent, or Firm—Norman B. Rainer

[57] ABSTRACT

An adjustable framework is provided for supporting elongated loads over the cargo bed of a pick-up truck and alternatively for supporting a contoured sheath to form a camper compartment above the cargo bed. The framework is comprised of paired side rails, each supported by terminal and center legs, and two transverse rails extending horizontally between said side rails. The two center legs, or the four terminal legs are adapted to provide controlled forceful upward motion. Said motion is preferably produced by a piston-cylinder mechanism.

8 Claims, 4 Drawing Sheets

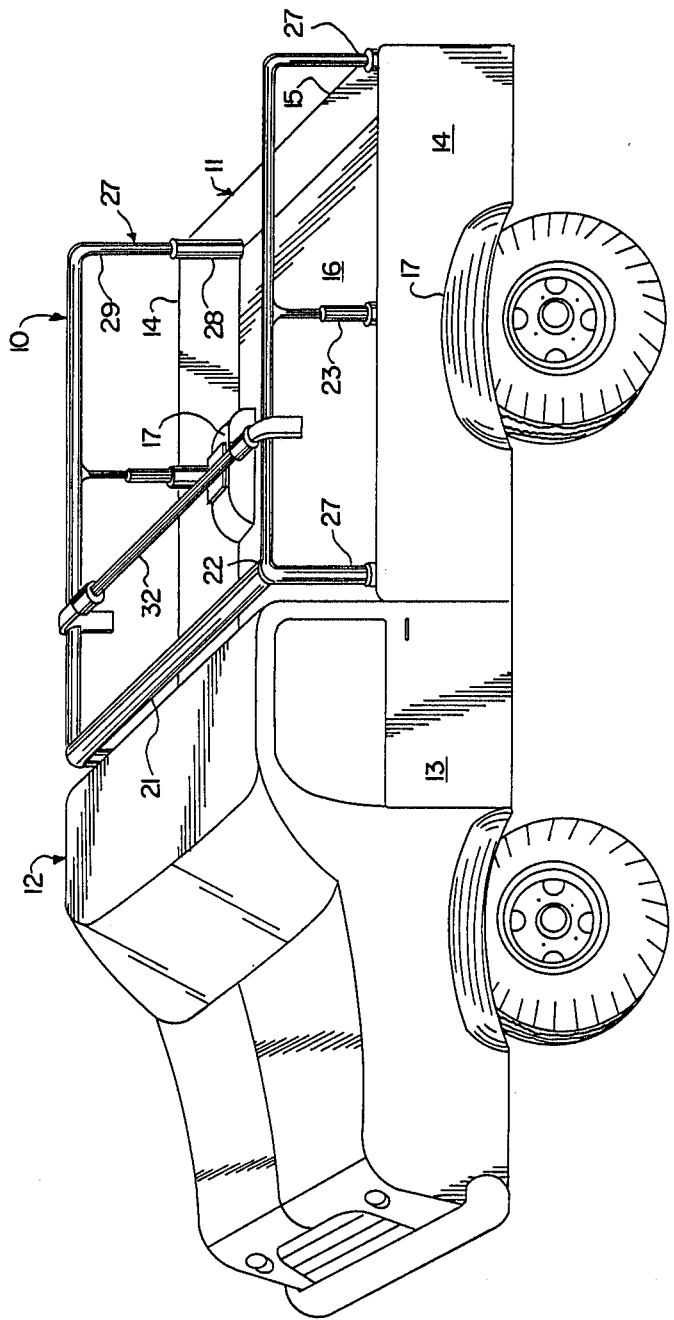

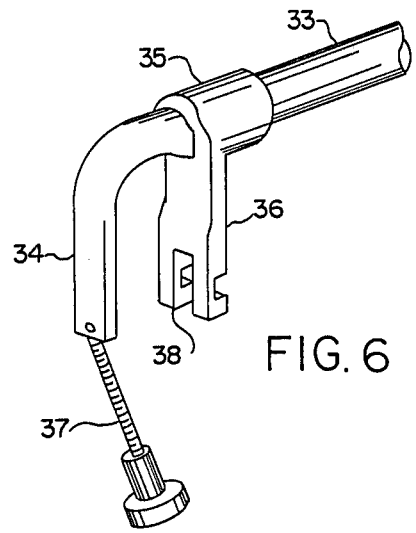
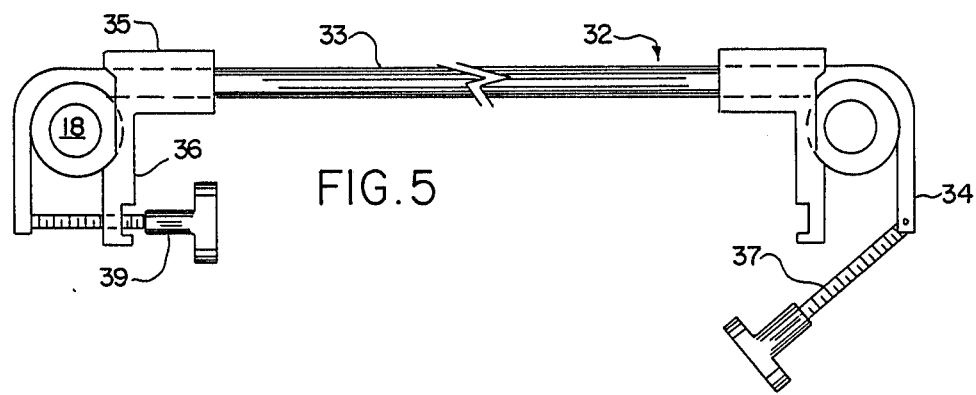
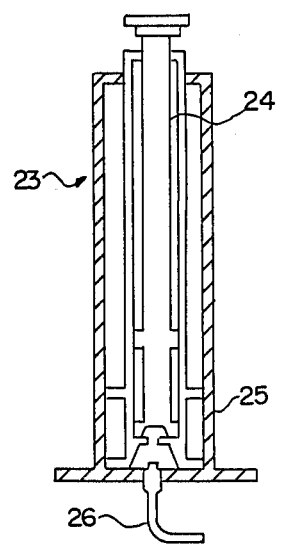

ADJUSTABLE FRAMEWORK FOR THE CARGO BED OF A PICK-UP TRUCK

BACKGROUND OF THE INVENTION

This invention relates in general to an adjustable framework for supporting elongated loads over the cargo bed and cab of a pick-up truck, and for the further purpose of forming a camper enclosure above said cargo bed.

Various types of carrying racks are known for use in association with the cargo area of a pick-up truck. Such racks are usually mounted upon side walls or floor of the cargo area, and extend upwardly to a height generally comparable to the roof of the cab of the vehicle.

In most instances, prior racks and frameworks have been of expensive construction, difficult to install, and of limited versatility or adjustablity.

It is accordingly an object of the present invention to provide a framework of adjustable height for the cargo bed of a pick-up truck.

It is another object of this invention to provide a framework as in the foregoing object having load-stabilizing means positionable along the length of said cargo bed.

It is a further object of the present invention to provide a framework of the aforesaid nature which can be covered with a contoured sheath to form a camper compartment above said cargo bed.

It is a still further object of this invention to provide a framework of the aforesaid nature of rugged and durable construction amenable to low cost manufacture and easy installation onto said cargo bed.

These objects and other objects and advantages of the invention will be apparent from the following description.

SUMMARY OF THE INVENTION

The above and other beneficial objects and advantages are accomplished in accordance with the present invention by a framework adapted to be installed into a pick-up truck having a driver's cab and a rearwardly disposed cargo bed having a floor, paired sidewalls, a front extremity adjacent said cab, and a rear extremity, said framework comprising:

(a) a pair of straight side rails of equal length in parallel disposition and having horizontally aligned forward and rearward extremities, (b) a first transverse rail extending perpendicularly between the forward extremities of said side rails in fixed relationship therewith, (c) a center leg extending vertically between the floor of the cargo bed and the center of said side rail, (d) forward and rearward terminal legs extending vertically between the floor of the cargo bed and the corresponding extremities of each side rail, (e) said legs being comprised of two telescoping members having means for the positive interengagement of said members to prevent movement therebetween, and (f) a second transverse rail extending perpendicularly between said side rails and slideably interengageable therewith, (g) a symmetrical selection of said legs, namely both center legs or all four terminal legs being capable of controlled forceful upward motion, whereby (h) both side rails may be controllably elevated to a desired height above the floor of the cargo bed and locked at said height.

The floor of the cargo bed may incorporate upwardly directed housings for the rear wheels of the vehicle, and such housings are considered part of the floor for the purposes of this invention. The controlled forceful upward motion is preferably achieved by means of a piston housed within a pressurizable cylinder and adapted to rise within the cylinder in response to pressure therein. However, the upward motion may also be applied by hand methods such as a geared crank, or by electric or gasoline driven motors. The side rails and transverse rails are preferably of metal pipe construction. Pipe fittings may be employed for the joinder of the legs to the side rails and first transverse rail.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all of the figures of the drawing:

FIG. 1 is perspective view of an embodiment of the framework of this invention shown installed into a pick-up truck.

FIG. 4 is an enlarged sectional view taken along the line 4—4 of FIG. 3.

FIG. 5 is an enlarged side view of the second transverse rail component of the framework of FIG. 1.

FIG. 6 is a fragmentary perspective view of the transverse rail of FIG. 5.

DESCRIPTION OF THE PREFERRED EMBODIMENT

Figure 3:
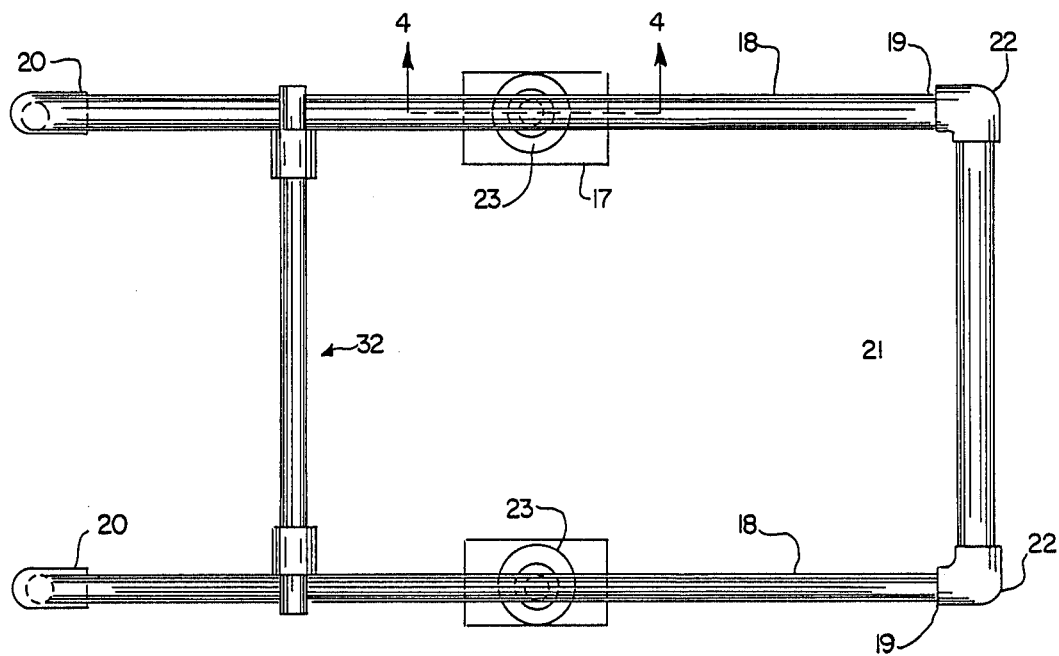
FIG. 3 is a top view of the framework of FIG. 2, and indicating positional movement.

Referring to FIGS. 1-4, an embodiment of the framework 10 of the present invention is shown installed within the cargo area 11 of a pick-up truck 12 having a driver's cab 13 forward of the said cargo area. The cargo area is bounded by paired sidewalls 14, tailgate 15, cab 13 and floor 16 having opposed upraised wheel housings 17.

Framework 10 is comprised of paired straight side rails 18 of equal length in parallel disposition in a horizontal plane, each side rail having forward and rearward extremities 19 and 20, respectively, the four extremities of said paired side rails being disposed in a rectangular locus.

A first transverse rail 21 extends perpendicularly between the forward extremities of the side rails, and is joined to said side rails by conventional pipe fittings 22.

Figure 2:
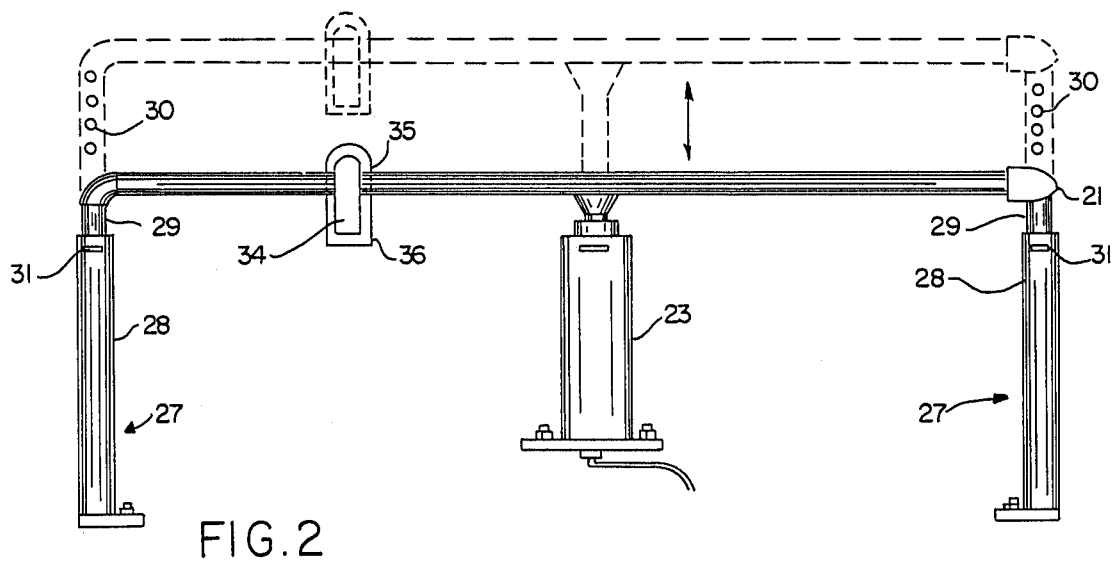
FIG. 2 is an enlarged side view of the framework of FIG. 1.

A center leg 23 extends vertically from bolted engagement with wheel housing 17 of floor 16 to the center of each side rail. As shown in the sectional view of FIG. 4, center leg 23 is comprised of an internal piston 24 telescopically housed within cylinder 25 provided with a pressurizing line 26 which supplies hydraulic or pneumatic pressure to said cylinder. By controlling the pressure transmitted to cylinder 25, the height of the side rails may be adjusted, as shown in FIG. 2.

A terminal leg 27 extends vertically between floor 16 and each extremity of each side rail. As shown more clearly in FIG. 2, each terminal leg is comprised of an outer cylinder 28 bolted to floor 16, and an inner member 29 whose upper extremity is attached by pipe joints to the side rail. The inner member is adapted to telescopically slide within the outer member. Locking means in the form of a series of holes 30 in inner member 29 and a securement pin 31 penetrating said outer member permits positive interengagement of the inner and outer member at a desired leg height.

A second transverse rail 32 extends perpendicularly between the side rails in slideable engagement therewith. As shown more clearly in FIGS. 5 and 6, rail 32 is comprised of a center bar 33 having downturned flattened extremities 34. Paired collars 35, having pendant retaining shoulders 36 with downwardly opening engaging slots 38, are slideably associated with center bar 33. A threaded tightening rod 37 is pivotably attached to the lower extremity of flattened extremities 34. When it is desired to anchor transverse rail 32 in a desired position, the tightening rods 37 are raised to their horizontal position, thereby entering slots 38, and are secured to handle 39 which threadably advances upon rod 37 until tight contact is made with shoulder 36.

Figure 7:
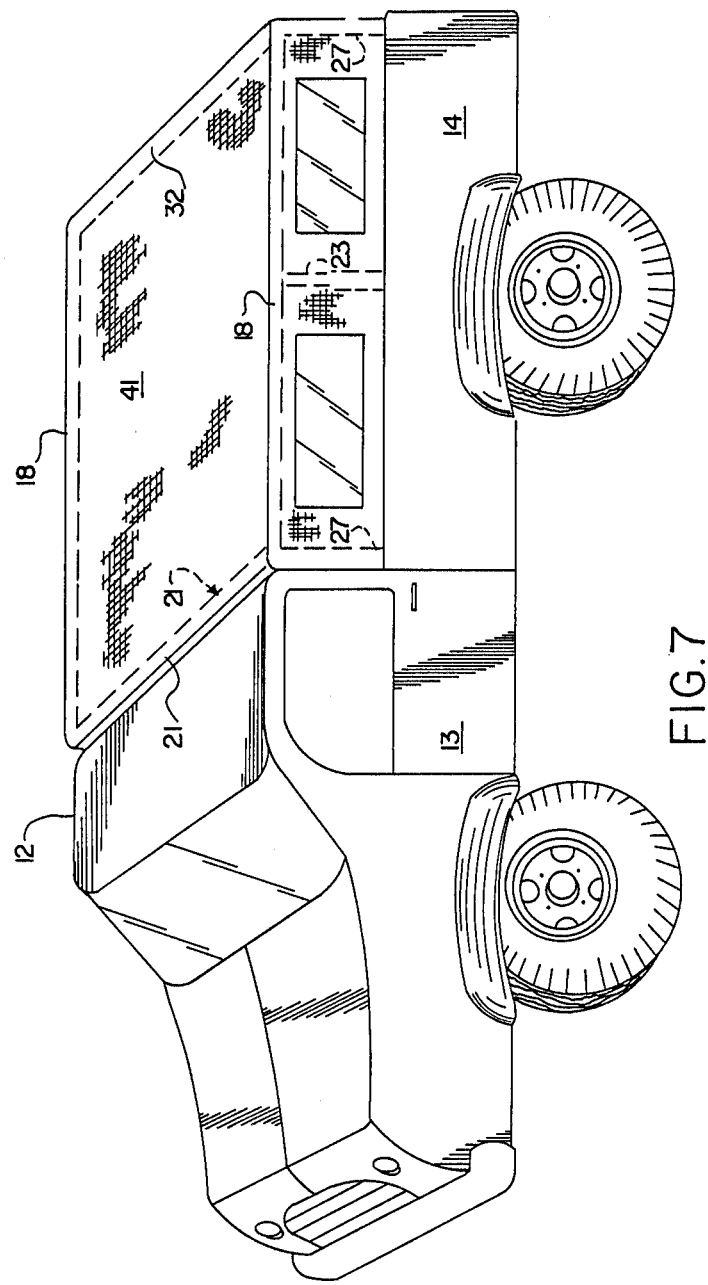
FIG. 7 is a perspective view of the embodiment of FIG. 1 covered with a contoured fabric structure to form a camper compartment above said cargo bed.

As shown in FIG. 7, when the framework is raised to its highest elevation, a canvas or plastic covering 41 with suitable door and window openings may be disposed over the framework, thereby forming a camper structure. Alternatively, separate rigid panels may be attached to the framework to form the camper structure.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A framework adapted to be installed into a pick-up truck having a driver's cab and a rearwardly disposed cargo bed having a floor, paired sidewalls, a front extremity adjacent said cab, and a rear extremity, said framework comprising:
   (a) a pair of straight side rails of equal length in parallel disposition and having horizontally aligned forward and rearward extremities,
   (b) a first transverse rail extending perpendicularly between the forward extremities of said side rails in fixed relationship therewith,
   (c) a center leg extending vertically between the floor of the cargo bed and the center of each of said side rails,
   (d) forward and rearward legs extending vertically between the floor of the cargo bed and the corresponding extremities of each side rail,
   (e) said legs being comprised of two telescoping members having means for the positive interengagement of said members to prevent movement therebetween,
   (f) a second transverse rail extending perpendicularly between said side rails and slideably interengageable therewith, and
   (g) means for simultaneously raising and lowering said legs, whereby
   (h) both side rails may be controllably elevated to a desired height above the floor of the cargo bed and locked at said height.

2. The framework of claim 1 wherein said symmetrical selection of said legs is both center legs.

3. The framework of claim 1 wherein said symmetrical selection of said legs is all four terminal legs.

4. The framework of claim 1 wherein those legs capable of controlled forceful upward motion are comprised of a piston housed within a pressurizable cylinder and adapted to rise within the cylinder in response to pressure therein.

5. The framework of claim 1 wherein said side rails and transverse rails are of metal pipe construction.

6. The framework of claim 1 wherein pipe fittings are employed for the joinder of the legs to the side rails and first transverse rail.

7. The framework of claim 1 wherein the four extremities of said pair of side rails are disposed in a rectangular locus.

8. The framework of claim 1 provided with a contoured sheath to form a camper compartment above said cargo bed.

* * * * *